(12) United States Patent
Li et al.

(10) Patent No.: US 12,202,023 B2
(45) Date of Patent: Jan. 21, 2025

(54) DISASSEMBLING MECHANISM FOR WASTE BATTERY MODULE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Aixia Li, Guangdong (CN); Haijun Yu, Guangdong (CN); Changdong Li, Guangdong (CN); Yinghao Xie, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/558,149

(22) PCT Filed: Jul. 15, 2022

(86) PCT No.: PCT/CN2022/106022
§ 371 (c)(1),
(2) Date: Oct. 30, 2023

(87) PCT Pub. No.: WO2023/240736
PCT Pub. Date: Dec. 21, 2023

(65) Prior Publication Data
US 2024/0326109 A1   Oct. 3, 2024

(30) Foreign Application Priority Data

Jun. 16, 2022  (CN) .......................... 202210679686.6

(51) Int. Cl.
*H01M 10/54* (2006.01)
*B09B 3/35* (2022.01)
(Continued)

(52) U.S. Cl.
CPC ............... *B09B 3/35* (2022.01); *H01M 10/54* (2013.01); *B09B 2101/16* (2022.01); *H01M 6/52* (2013.01); *Y10T 29/53278* (2015.01)

(58) Field of Classification Search
CPC ............ Y10T 29/53278; H01M 10/54; H01M 6/52; B09B 3/35; B09B 2101/16
See application file for complete search history.

(56) References Cited

U.S. PATENT DOCUMENTS

2021/0167434 A1\* 6/2021 Cao ........................ H01M 10/54

FOREIGN PATENT DOCUMENTS

| CN | 208706801 | 4/2019 |
| CN | 212162018 | 12/2020 |

(Continued)

OTHER PUBLICATIONS

Miloradović et al, "Challenges in the Automated Disassembly Process of Electric Vehicle Battery Packs," 2023 IEEE 28th International Conference on Emerging Technologies and Factory Automation (ETFA), Sinaia, Romania, 2023, pp. 1-4. (Year: 2023).\*

(Continued)

*Primary Examiner* — A. Dexter Tugbang
(74) *Attorney, Agent, or Firm* — Leason Ellis LLP (57) ABSTRACT

A disassembling mechanism for a waste battery module includes a substrate. The substrate is provided with a clamping mechanism, a cutting mechanism, a placement platform, a storage box, a traction mechanism and a linkage mechanism at a top portion. The linkage mechanism includes a sliding rod, a sliding block, a linkage rack and a gear box. The traction mechanism is fixed at one end of the clamping (Continued)

mechanism far away from the placement platform. One end of a traction member of the traction mechanism is connected with the cutting mechanism, and the other end of the traction member is connected with the sliding block.

13 Claims, 3 Drawing Sheets (51) Int. Cl.
*H01M 6/52* (2006.01)
*B09B 101/16* (2022.01)

(56) References Cited

FOREIGN PATENT DOCUMENTS

| CN | 214588985 | | 11/2021 | | |
|---|---|---|---|---|---|
| CN | 113851750 | | 12/2021 | | |
| JP | 2019125444 | A * | 7/2019 | ........ | H01M 10/0481 |
| KR | 20130070240 | | 6/2013 | | |

OTHER PUBLICATIONS

International Search Report and Written Opinion issued for the PCT application No. PCT/CN2022/106022 on Jul. 3, 2023 with English translation (9 pages).

* cited by examiner

DISASSEMBLING MECHANISM FOR WASTE BATTERY MODULE

CROSS-REFERENCE TO RELATED APPLICATION

This application is a national stage filing under 35 U.S.C. § 371 of international application number PCT/CN2022/106022, filed Jul. 15, 2022, which claims priority to Chinese patent application No. 202210679686.6 filed Jun. 16, 2022. The contents of these applications are incorporated herein by reference in their entirety.

TECHNICAL FIELD

The present disclosure relates to the technical field of battery module disassembling, and more particularly, to a disassembling mechanism for a waste battery module.

BACKGROUND

Rechargeable batteries generally include nickel-cadmium, nickel-hydrogen and lithium ion batteries, while cadmium in the nickel-cadmium batteries is one of the heavy metal elements strictly controlled by environmental protection. Organic electrolytes in the lithium ion batteries, alkali in the nickel-cadmium and nickel-hydrogen batteries and heavy metals such as copper, an auxiliary material for manufacturing batteries, all cause environmental pollution. The recycling of waste rechargeable batteries can not only effectively protect the environment, but also recycle the recovered metal materials, which can save the waste of resources to a certain extent.

In the existing recycling process of the waste rechargeable batteries, it is often necessary to disassemble a battery module first, and then decompose and recycle an inner core of the battery. However, the existing battery module dismantling methods are mostly manual dismantling, that is, after the waste battery is mechanically cut, a shell of the battery needs to be manually peeled off before the inner core of the battery contained in the shell can be taken out. Therefore, the operation is cumbersome, time-consuming and labor-intensive, and a body of an operator is easily hurt by a sharp incision of the shell of the battery or improper operation of a cutting machine. Therefore, a device that can automatically disassemble the battery module is urgently needed to solve the above problems.

SUMMARY

The object of the present application is to provide a disassembling mechanism for a waste battery module, so as to solve the problems in the background above.

In order to achieve the object above, the technical solutions of the present disclosure are as follows: a disassembling mechanism for a waste battery module include a substrate; the substrate is provided with a clamping mechanism, a cutting mechanism, a placement platform, a storage box, a traction mechanism and a linkage mechanism at a top portion; the clamping mechanism and the cutting mechanism are respectively located at two ends of the top portion of the substrate; the placement platform is arranged just below a clamping part of the clamping mechanism, and the placement platform includes a movable platform and a fixed platform, and the movable platform is rotatably arranged in a center of the fixed platform; a cutting part of the cutting mechanism extends to just above the movable platform of the placement platform; the storage box includes a shell collecting frame and an inner core collecting frame, the shell collecting frame is arranged below the clamping mechanism at one end of the fixed platform far away from the movable platform, and the inner core collecting frame is arranged just below the movable platform; the linkage mechanism includes a sliding rod, a sliding block, a linkage rack and a gear box; the sliding rod is arranged between the inner core collecting frame and a fixed end of the cutting mechanism along a length direction of the substrate; the sliding block and the linkage rack are both slidably arranged on the sliding rod, the linkage rack is located between the inner core collecting frame and the sliding block, and a spring is sleeved outside the sliding rod between the sliding block and the fixed end of the cutting mechanism; the sliding block is movably provided with two connecting arms for connecting the clamping part of the clamping mechanism at a top portion; the gear box is fixed at a rotating shaft of the movable platform through a fixing rod, and the gear box is provided with an upper sliding rod and a lower sliding rod, the two sliding rods are connected through a gear in the gear box, where one end of one sliding rod is connected with the linkage rack, so that the linkage rack is capable of pushing the sliding rod to drive the gear in the gear box to rotate when sliding and displacing along the sliding rod, and linking the movable platform to rotate around a rotating shaft thereof; and the traction mechanism is fixed at one end of the clamping mechanism far away from the placement platform, and one end of a traction member of the traction mechanism is connected with the cutting mechanism, and the other end of the traction member is connected with the sliding block.

Further, the clamping mechanism includes a pedestal, a first motor, a screw stem, two slides, two supporting racks and two clamping rods; the pedestal is arranged along a width direction of the substrate; the first motor is fixed at one end of the pedestal; the screw stem is arranged inside the pedestal along an arrangement direction of the pedestal, and one end of the screw stem is connected with an output shaft of the first motor; the two slides are both sleeved outside the screw stem and slidably connected with the pedestal, so that the screw stem is capable of driving the two slides to move to a center of the pedestal or to two ends of the pedestal synchronously during rotating; the two supporting racks are respectively fixed on top portions of the two slides, the two supporting racks both have a sector structure, and the two supporting racks are symmetrically arranged about a central axis in the length direction of the substrate; and the two clamping rods are fixed above the two supporting racks respectively, and each clamping rod is capable of moving along an arc-shaped edge of the supporting rack below the clamping rod; one end of the clamping rod is movably connected with the connecting arm, and the clamping rod is provided with a movable clamping plate on one side close to the cutting mechanism, such that the clamping rod forms the clamping part of the clamping mechanism, which is used for fixing and clamping the waste battery.

Furthermore, each supporting rack is provided with a guide groove on the arc-shaped edge, and each clamping rod is provided with a guide block matched with the guide groove at a bottom portion, so that the clamping rod is capable of being sliding and displacing along the arc-shaped edge of the supporting rack through the match between the guide block and the guide groove.

Further, the shell collecting frame is located directly below the sector groove of the supporting rack; and when the clamping rod slides and displaces along the arc-shaped edge of the supporting rack, a clamping gap of the movable clamping plate is always located in an opening range of the shell collecting frame.

Further, the cutting mechanism includes a second motor, a protective cover, a fixed plate, a blade and a telescopic rod; the telescopic rod is connected with the substrate, the fixed plate is fixed at a top end of the telescopic rod, and the fixed plate is provided with a slide track at a bottom portion of one end far away from the telescopic rod, and the protective cover is slidably arranged in the slide track; the second motor is fixed at an outer side of one end of the protective cover; and the blade is rotatably arranged inside the protective cover and connected with an output shaft of the second motor, so that the blade forms the cutting part of the cutting mechanism.

Furthermore, the protective cover is provided with an opening at a bottom end, and the protective cover is provided with a sliding block matched with the slide track at a top end.

Further, the traction mechanism includes a mounting plate, two first guide wheels, two second guide wheels, a pulling rope and a tension wheel; the mounting plate is connected to a middle portion of the substrate on one side of the pedestal far away from the supporting rack; the two first guide wheels are respectively fixed at upper and lower ends of one side of the mounting plate facing the pedestal; the two second guide wheels are fixed right below middle portions of the two supporting racks; the tension wheel is fixed at one end of the protective cover; and one end of the pulling rope is connected with the tension wheel, and the other end of the pulling rope passes through the two first guide wheels in turn, and is divided into two ropes, which respectively extend to the two second guide wheels, and then extend to both sides of the sliding block from the two second guide wheels and are connected with the sliding block, so that the pulling rope is capable of forming a traction member that is connected with the cutting mechanism and the sliding block.

Furthermore, the sliding block are provided with connecting rods for connecting the two ropes of the pulling rope on both sides.

Further, the sliding rod is at least provided with a limiting groove for limiting a sliding stroke of the linkage rack on an outer side wall.

Further, the gear box is internally provided with a first gear, a first sliding rod, a second gear, a second sliding rod, a third gear and a fourth gear; the first gear and the third gear are arranged on the same rotating shaft; the second gear is rotatably arranged under the first gear; the fourth gear is arranged on the rotating shaft of the movable platform and meshed with the third gear; and the first sliding rod and the second sliding rod form upper and lower sliding rods of the gear box, the first sliding rod is provided with a tooth socket meshed with the first gear at an upper end, and the first sliding rod is provided with a tooth socket meshed with the second gear at a lower end; the second sliding rod is provided with a tooth socket meshed with the second gear at an upper end, and one end of the second sliding rod is connected with the linkage rack.

Compared with the existing technology, the present disclosure has the following beneficial effects:

(1) According to the present disclosure, by adopting the clamping mechanism, the cutting mechanism, the placement platform, the storage box, the traction mechanism and the linkage mechanism, the clamping part of the clamping mechanism can clamp and fix the battery to be disassembled at the placement platform, and the shell of the battery can be cut and disassembled by the cutting part of the cutting mechanism. When the cutting part of the cutting mechanism moves and cuts, the sliding block of the linkage mechanism can be pulled by the traction mechanism to move to one end of the placement platform, and then the clamping part of the clamping mechanism can be pushed to move from the movable platform to the fixed platform by the connecting arm at the top portion of the sliding block, so that the waste battery fixed in the clamping part of the clamping mechanism can be pulled and broken from both sides along the notch opening slot on the shell, and the inner core of the battery can freely fall on the movable platform, thus being separated from the shell of the battery, reducing the complicated operation caused by manually peeling off the shell of the battery, improving the disassembling rate of the battery module, and avoiding the bodily injury caused by manually peeling off the shell of the battery.

(2) According to the present disclosure, by arranging the first gear, the first sliding rod, the second gear, the second sliding rod, the third gear and the fourth gear in the gear box, when the sliding block pushes the linkage rack to move to one end of the movable platform, the second gear can be pushed to rotate by the second sliding rod, so that the second gear drives the first sliding rod to move and push the first gear and the third gear to rotate synchronously. In this way, the rotating third gear engages with the fourth gear to rotate, such that the rotating shaft of the movable platform rotates to turn down the movable platform, and the separated inner core of the battery can be automatically unloaded for centralized collection.

(3) According to the present disclosure, the clamping mechanism is formed by the pedestal, the first motor, the screw stem, the slide, the supporting rack, the movable clamping plate and the clamping rod, so that the clamping mechanism can drive the screw stem to rotate through the rotation of the first motor, and drive the clamping rod to move through the movement of the two slides, so that the clamping part of the clamping mechanism is formed by the clamping rod to clamp and fix waste batteries of different sizes, thus ensuring that the batteries will not slip and misalign when being cut by the cutting mechanism, and ensuring the stable disassembling of the battery.

(4) According to the present disclosure, the cutting mechanism is formed by the second motor, the protective cover, the fixed plate, the blade and the telescopic rod, so that the blade can change the actual cutting height and cutting position through the movement of the protective cover on the fixed plate and the lifting of the telescopic rod, so that the cutting mechanism can be adaptively adjusted according to the size of the battery to be disassembled to meet the cutting and disassembling requirements of batteries with different sizes.

2 refers to clamping mechanism, 21 refers to pedestal, 22 refers to first motor, 23 refers to screw stem, 24 refers to slide, 25 refers to supporting rack, 251 refers to guide groove, 26 refers to movable clamping plate, 27 refers to clamping rod, and 271 refers to guide block;

3 refers to cutting mechanism, 31 refers to second motor, 32 refers to protective cover, 321 refers to sliding block, 33 refers to fixed plate, 34 refers to blade, and 35 refers to telescopic rod;

4 refers to placement platform, 41 refers to movable platform, and 42 refers to fixed platform;

5 refers to storage box, 51 refers to shell collecting frame, and 52 refers to inner core collecting frame;

6 refers to traction mechanism, 61 refers to mounting plate, 62 refers to first guide wheel, 63 refers to second guide wheel, 64 refers to pulling rope, and 65 refers to tension wheel;

7 refers to linkage mechanism, 71 refers to spring, 72 refers to sliding rod, 721 refers to limiting groove, 73 refers to sliding block, 731 refers to connecting arm, 732 refers to connecting rod, 74 refers to linkage rack, 75 refers to gear box, 751 refers to first gear, 752 refers to first sliding rod, 753 refers to second gear, 754 refers to second sliding rod, 755 refers to third gear, and 756 refers to fourth gear.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present disclosure, but should not be construed as limiting the present disclosure.

Embodiment 1

As shown in FIGS. 1 to 5, a disassembling mechanism for a waste battery module includes a substrate 1. The substrate 1 is provided with a clamping mechanism 2, a cutting mechanism 3, a placement platform 4, a storage box 5, a traction mechanism 6 and a linkage mechanism 7 at a top portion. The clamping mechanism 2 and the cutting mechanism 3 are respectively located at two ends of the top portion of the substrate 1. The placement platform 4 is arranged just below a clamping part of the clamping mechanism 2, and the placement platform 4 includes a movable platform 41 and a fixed platform 42, and the movable platform 41 is rotatably arranged in a center of the fixed platform 42. A cutting part of the cutting mechanism 3 extends to just above the movable platform 41 of the placement platform 4. The storage box 5 includes a shell collecting frame 51 and an inner core collecting frame 52, the shell collecting frame 51 is arranged below the clamping mechanism 2 at one end of the fixed platform 42 far away from the movable platform 41, and the inner core collecting frame 52 is arranged just below the movable platform 41. The linkage mechanism 7 includes a sliding rod 72, a sliding block 73, a linkage rack 74 and a gear box 75. The sliding rod 72 is arranged between the inner core collecting frame 52 and a fixed end of the cutting mechanism 3 along a length direction of the substrate 1. The sliding block 73 and the linkage rack 74 are both slidably arranged on the sliding rod 72, the linkage rack 74 is located between the inner core collecting frame 52 and the sliding block 73, and a spring 71 is sleeved outside the sliding rod 72 between the sliding block 73 and the fixed end of the cutting mechanism 3. The sliding block 73 is movably provided with two connecting arms 731 for connecting the clamping part of the clamping mechanism 2 at a top portion. The gear box 75 is fixed at a rotating shaft of the movable platform 41 through a fixing rod, and the gear box 75 is provided with an upper sliding rod and a lower sliding rod, the two sliding rods are connected through a gear in the gear box 75, where one end of one sliding rod is connected with the linkage rack 74, so that the linkage rack 74 is capable of pushing the sliding rod to drive the gear in the gear box 75 to rotate when sliding and displacing along the sliding rod 72, and linking the movable platform 41 to rotate around a rotating shaft thereof. The traction mechanism 6 is fixed at one end of the clamping mechanism 2 far away from the placement platform 4, and one end of a traction member of the traction mechanism 6 is connected with the cutting mechanism 3, and the other end of the traction member is connected with the sliding block clamping mechanism 73. The clamping part of the clamping mechanism 2 can clamp and fix a battery to be disassembled on the storage platform 4, so that a cutting path of the cutting part of the cutting mechanism 3 is located at a waist line of a plurality of cores of the battery to be disassembled, and the cutting part of the cutting mechanism 3 can cut along the waist line of the cores during the movement process, so that the plurality of internal cores can naturally fall on the movable platform 41 after a shell of the battery is disassembled. Because the traction member of the traction mechanism 6 is connected with the cutting mechanism 3 and the sliding block 73, when the cutting part of the cutting mechanism 3 is adjusted to a proper position and after the traction member is tensioned between the cutting mechanism 3 and the sliding block 73, with the movable cutting of the cutting part of the cutting mechanism 3 (the cutting part of the cutting mechanism 3 moves from one end of the placement platform 4 to the fixed end of the cutting mechanism 3), the sliding block 73 may move along the sliding rod 72 to one end of the placement platform 4 under the action of the traction member. In this case, the connecting arm 731 may push the clamping part of the clamping mechanism 2 to move from the movable platform 41 to the fixed platform 42, so that the waste battery fixed in the clamping part of the clamping mechanism 2 can be pulled to both sides along a notch opening on the shell, to promote the shell of the battery to be broken to both sides, so that the inner core of the battery can fall on the movable platform 41 to separate from the shell of the battery. When moving to the linkage rack 74, the sliding block 73 may push the linkage rack 74 to slide along the sliding rod 72, so that the lower end sliding rod arranged in the gear box 75 moves and drives the gear inside the gear box 75 to run and link the upper end sliding rod in the gear box 75 to move, so that the movable platform 41 can rotate around the rotating shaft thereof under the action of the gear in the gear box 75, and so that the movable platform 41 can rotate around the rotating shaft thereof under the action of the gear inside the gear box 75, such that the inner core of the battery falling on the movable platform 41 can fall into the inner core collecting frame 52 along with the turned movable platform 41, and the shell of the battery fixed at the clamping part of the clamping mechanism 2 can move to the shell collecting frame 51, and fall into the shell collecting frame 51 for collection along with the loosening of the clamping part of the clamping mechanism 2. As such, the shell of the battery and the inner core of the battery can be collected by classification after the waste battery is disassembled by the device, which reduces the complicated operation caused by manually peeling off the shell of the battery, improves the disassembling rate of the battery module and avoids bodily injury caused by manually peeling off the shell of the battery.

As shown in FIGS. 1 to 4, in this embodiment, the clamping mechanism 2 includes a pedestal 21, a first motor 22, a screw stem 23, two slides 24, two supporting racks 25 and two clamping rods 27. The pedestal 21 is arranged along a width direction of the substrate 1. The first motor 22 is fixed at one end of the pedestal 21. The screw stem 23 is arranged inside the pedestal 21 along an arrangement direction of the pedestal 21, and one end of the screw stem 23 is connected with an output shaft of the first motor 22. The two slides 24 are both sleeved outside the screw stem 23 and slidably connected with the pedestal 21, so that the screw stem 23 is capable of driving the two slides 24 to move to a center of the pedestal 21 or to two ends of the pedestal 21 synchronously during rotating. The two supporting racks 25 are respectively fixed on top portions of the two slides 24, the two supporting racks 25 both have a sector structure, and the two supporting racks 25 are symmetrically arranged about a central axis in the length direction of the substrate 1. The two clamping rods 27 are fixed above the two supporting racks 25 respectively, and each clamping rod 27 is capable of moving along an arc-shaped edge of the supporting rack 25 below the clamping rod; one end of the clamping rod 27 is movably connected with the connecting arm 731, and the clamping rod 27 is provided with a movable clamping plate 26 on one side close to the cutting mechanism 3, such that the clamping rod 27 forms the clamping part of the clamping mechanism 2, which is used for fixing and clamping the waste battery. When rotating, the first motor 22 can drive the screw stem 23 to rotate. Under the action of the screw stem 23, the two slides 24 synchronously move to the center of the pedestal 21 or to both ends of the pedestal 21 along an arrangement direction of the pedestal 21, so as to adjust a spacing between the two clamping rods 27, and then the clamping part of the clamping mechanism 2 is formed by the two clamping rods 27 to clamp and fix waste batteries of different sizes. In this embodiment, the clamping rod 27 is provided with a driving member (not shown in the figure) for adjusting the spacing of the movable clamping plate 26, so that the movable clamping plate 26 can also be adaptively adjusted according to the size of the shell of the waste battery, so that when the waste battery is fixed between the two clamping rods 27, the other two sides of the battery can be clamped by the movable clamping plate 26 on the clamping rod 27, and the clamping stability of the battery on the clamping rod 27 can be improved, so that the waste battery can be stably clamped on the placement platform 4, ensuring that the battery does not slip and misalign when being cut by the cutting mechanism 3, and ensuring the stable disassembling of the battery.

In this embodiment, each supporting rack 25 is provided with a guide groove 251 on the arc-shaped edge, and each clamping rod 27 is provided with a guide block 271 matched with the guide groove 251 a bottom portion, so that the clamping rod 27 is capable of being sliding and displacing along the arc-shaped edge of the supporting rack 25 through the match between the guide block 271 and the guide groove 251. The supporting rack 25 can be used as a supporting piece to support the clamping rod 27, and also enables the clamping rod 27 to slide along the arc-shaped edge of the supporting rack 25 when the clamping rod 27 is pushed by the connecting arm 731, which ensures that the clamping rod 27 can form an outward traction force at an incision of the shell of the battery in the process of disassembling the battery module, and prompts the shell of the battery to be broken to both sides along the incision direction to separate the inner core of the battery from the shell of the battery. The arrangement of the guide groove 251 and the guide block 271 can improve the connection between the supporting rack 25 and the clamping rod 27, and ensure that the clamping rod 27 can stably slide along the arc-shaped edge of the supporting rack 25.

Figure 1:
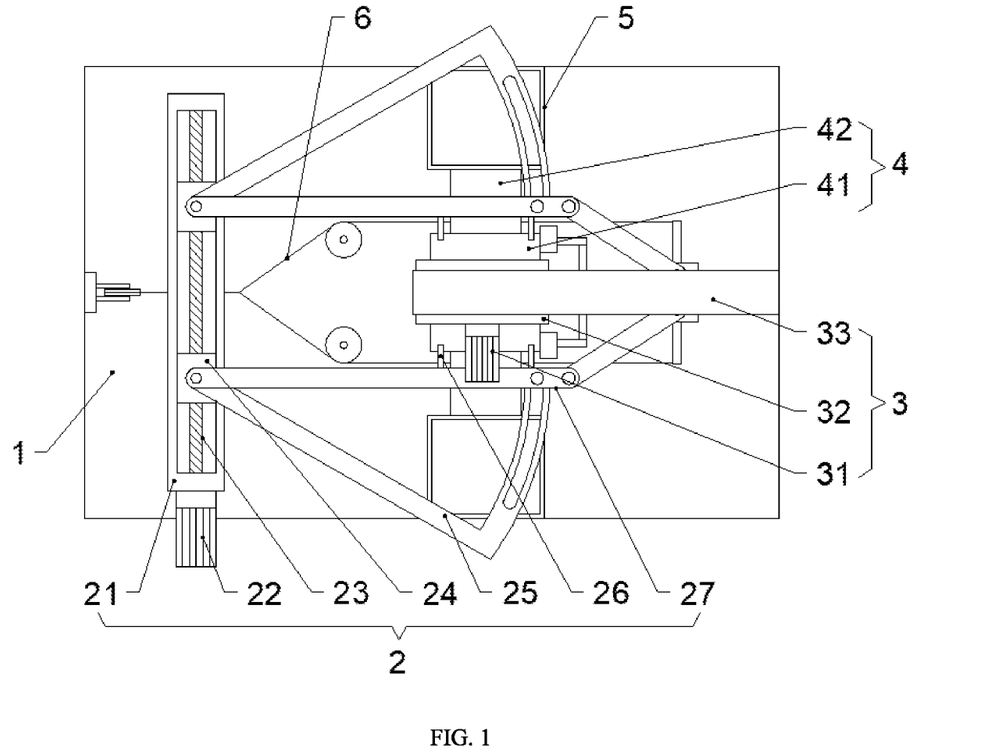
FIG. 1 is a schematic plan view of the present disclosure.
Figure 4:
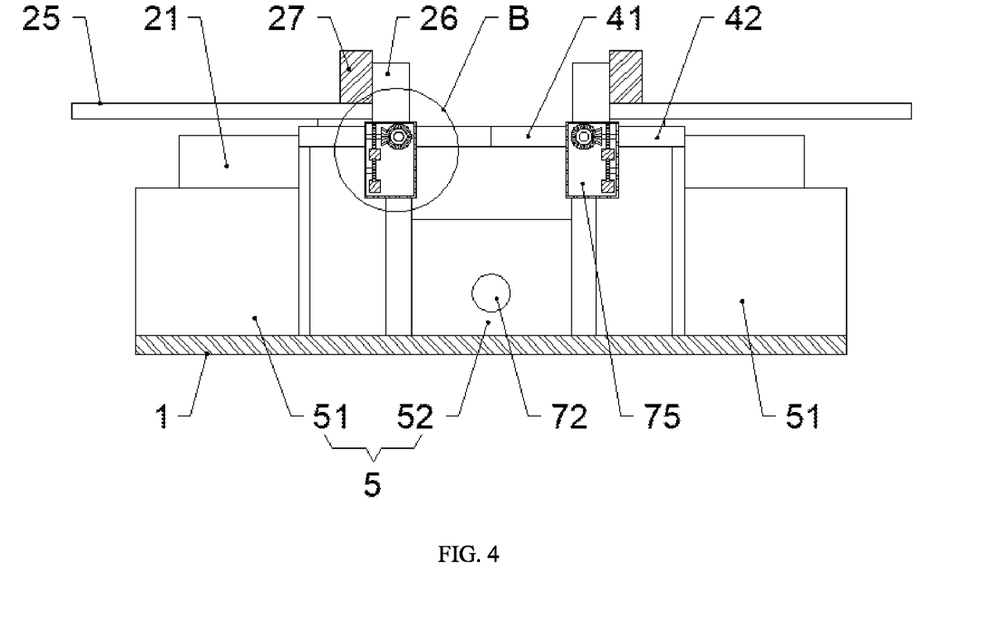
FIG. 4 is a schematic diagram of a cross section at a portion A-A in FIG. 3 of the present disclosure.

As shown in FIG. 1 and FIG. 4, in this embodiment, the shell collecting frame 51 is located directly below the sector groove of the supporting rack 25. The clamping rod 27 slides and displaces along the arc-shaped edge of the supporting rack 25, and a clamping gap of the movable clamping plate 26 is always located in an opening range of the shell collecting frame 51. The shell collecting frame 51 in the special position can always keep the shell of the battery clamped in a center of the movable clamping plate 26 in the opening range of the shell collecting frame 51 when the clamping rod 27 slides and displaces along the arc-shaped edge of the supporting rack 25, so that after the movable clamping plate 26 is loosened, the shell of the battery can directly fall into the shell collecting frame 51 for centralized collection.

Figure 2:
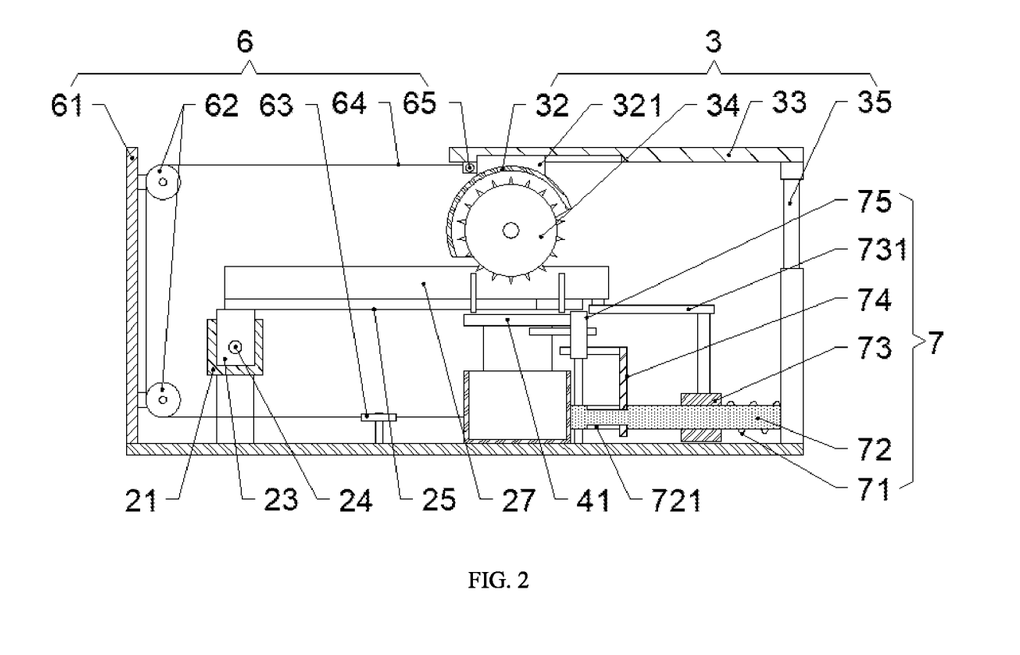
FIG. 2 is a schematic cross-sectional view of the present disclosure.

As shown in FIG. 1 and FIG. 2, in this embodiment, the cutting mechanism 3 includes a second motor 31, a protective cover 32, a fixed plate 33, a blade 34 and a telescopic rod 35. The telescopic rod 35 is connected with the substrate 1, the fixed plate 33 is fixed at a top end of the telescopic rod 35, and the fixed plate 33 is provided with a slide track at a bottom portion of one end far away from the telescopic rod 35, and the protective cover 32 is slidably arranged in the slide track. The second motor 31 is fixed at an outer side of one end of the protective cover 32.

The blade 34 is rotatably arranged inside the protective cover 32 and connected with an output shaft of the second motor 31, so that the blade 34 forms the cutting part of the cutting mechanism 3. One of an electric push rod, a hydraulic cylinder and an air cylinder, and preferably the hydraulic cylinder, may be adopted as the telescopic rod 35, so that the telescopic rod 35 can drive the fixed plate 33 to lift, thereby changing an actual cutting height of the blade 34 to meet cutting requirements of waste batteries of different sizes. The protective cover 32 can move along the slide track of the fixed plate 33, so that the protective cover 32 can drive the blade 34 to displace when the second motor 31 drives the blade 34 to rotate, and a cutting line is formed by the movement of the blade 34 to movably cut the shell of the waste battery.

In this embodiment, the protective cover 32 is provided with an opening at a bottom end, and the protective cover 32 is provided with a sliding block 321 matched with the slide track at a top end. The opening of the protective cover 32 is used to expose the blade 34, so that the blade 34 can have a certain protective structure, reduce the damage of flying debris to the blade 34 during cutting by the blade 34, and ensure that the blade 34 has a sufficient position to contact with the shell of the battery, so that the shell of the battery is cut through the exposed blade 34.

Figure 3:
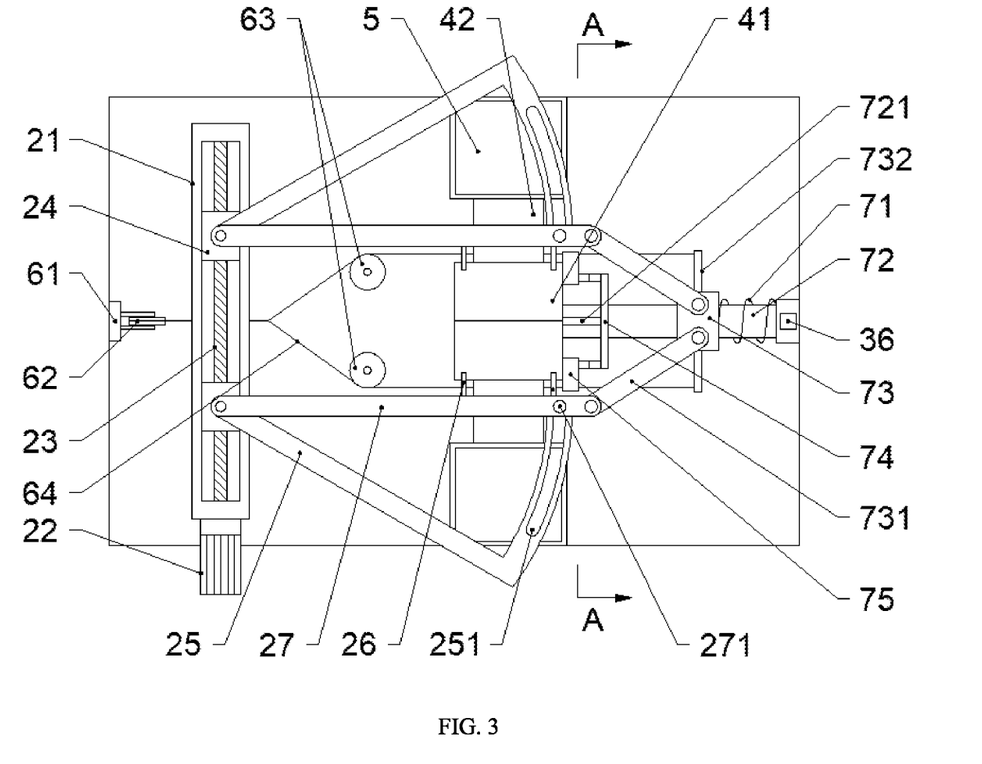
FIG. 3 is a schematic plan view of the present disclosure with a cutting mechanism removed.

As shown in FIG. 2 and FIG. 3, in this embodiment, the traction mechanism 6 includes a mounting plate 61, two first guide wheels 62, two second guide wheels 63, a pulling rope 64 and a tension wheel 65. The mounting plate 61 is connected to a middle portion of the substrate 1 on one side of the pedestal 21 far away from the supporting rack 25. The two first guide wheels 62 are respectively fixed at upper and lower ends of one side of the mounting plate 61 facing the pedestal 21. The two second guide wheels 63 are fixed right below middle portions of the two supporting racks 25. The tension wheel 65 is fixed at one end of the protective cover 32. One end of the pulling rope 64 is connected with the tension wheel 65, and the other end of the pulling rope passes through the two first guide wheels 62 in turn, and is divided into two ropes, which respectively extend to the two second guide wheels 63, and then extend to both sides of the sliding block 73 from the two second guide wheels 63 and are connected with the sliding block 73, so that the pulling rope 64 is capable of forming a traction member that is connected with the cutting mechanism 3 and the sliding block 73. The tension wheel 65 can tighten the pulling rope 64 after the clamping part of the clamping mechanism 2 and the cutting part of the cutting mechanism 3 are adjusted to proper positions, so that the fixed plate 33, the sliding block 73, the connecting arm 731 and the clamping rod 27 are in a tensioned state, ensuring that the protective cover 32 of the cutting mechanism 3 can pull the pulling rope 64 and then pull the sliding block 73 to move on the sliding rod 72, so that an angle of the connecting arm 731 can be changed when the sliding block 73 moves, so that the connecting arm 731 can push the clamping rod 27 to rotate, thus realizing the moving of the clamping rod 27 along the arc-shaped edge of the supporting rack 25. The first guide wheel 62 and the second guide wheel 63 may be used to guide the pulling rope 64 to ensure that the pulling rope 64 can be stably connected between the cutting mechanism 3 and the sliding block 73, and ensure that the pulling rope 64 can move stably.

In this embodiment, the sliding block 73 are provided with connecting rods 732 for connecting the two ropes of the pulling rope 64 on both sides. The connecting rod 732 can ensure that the sliding block 73 is stably connected with the two ropes of the pulling rope 64, and ensure that the pulling rope 64 can pull the sliding block 73 to move when the protective cover 32 of the cutting mechanism 3 moves.

As shown in FIG. 2, in this embodiment, the sliding rod 72 is at least provided with a limiting groove 721 for limiting a sliding stroke of the linkage rack 74 on an outer side wall. A number of the limiting groove 721 is preferably three, and the three limiting grooves 721 are arranged on the outer side wall of the sliding rod 72 at equal intervals, so that the linkage rack 74 can be slidably connected with the sliding rod 72 through the limiting grooves 721, and the movement stroke of the linkage rack 74 is limited (that is, a turning angle of the movable platform 41 is limited).

Figure 5:
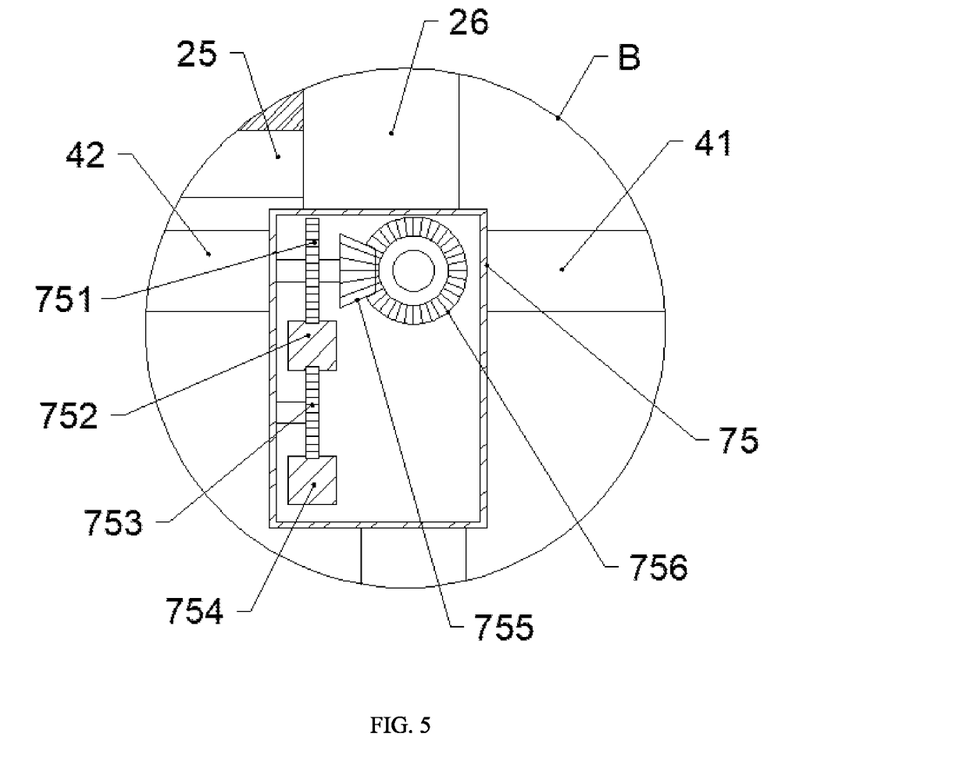
FIG. 5 is an enlarged schematic diagram of a portion B in FIG. 4 of the present disclosure.
In the drawings, the members represented by the reference numerals are listed as follows:
1 refers to substrate.

As shown in FIG. 4 and FIG. 5, in this embodiment, the gear box 75 is internally provided with a first gear 751, a first sliding rod 752, a second gear 753, a second sliding rod 754, a third gear 755 and a fourth gear 756. The first gear 751 and the third gear 755 are arranged on the same rotating shaft. The second gear 753 is rotatably arranged under the first gear 751. The fourth gear 756 is arranged on the rotating shaft of the movable platform 41 and meshed with the third gear 755. The first sliding rod 752 and the second sliding rod 754 form upper and lower sliding rods of the gear box 75, the first sliding rod 752 is provided with a tooth socket meshed with the first gear 751 at an upper end, and the first sliding rod 752 is provided with a tooth socket meshed with the second gear 753 at a lower end; the second sliding rod 754 is provided with a tooth socket meshed with the second gear 753 at an upper end, and one end of the second sliding rod 754 is connected with the linkage rack 74. The linkage rack 74 may be magnetically connected with the sliding block 73, and an elastic force of the spring 71 is larger than a magnetic attraction force of the linkage rack 74 and the sliding block 73, so that the sliding block 73 can be magnetically fixed after being attached to the linkage rack 74, so that the sliding block 73 can push the linkage rack 74 to move synchronously when moving to one end of the movable platform 41, and after the tension wheel 65 loosens the pulling rope 64 to reset the sliding block 73 under the action of the spring 71, the linkage rack 74 may be synchronously reset under the action of the sliding block 73 until the linkage rack 74 slides to the tail end of a limiting groove 721 and then separates from the sliding block 73, thus realizing the complete reset of the sliding block 73 and the linkage rack 74. When the sliding block 73 pushes the linkage rack 74 to move to one end of the movable platform 41, the second sliding rod 754 moves in the same direction as the linkage rack 74, and the moving second sliding rod 754 pushes the second gear 753 to rotate, so that the second gear 753 drives the first sliding rod 752 to move to the fixed end of the cutting mechanism 3, so that the first gear 751 and the third gear 755 rotate synchronously. In this way, the rotating third gear 755 engages with the fourth gear 756 to rotate, such that the rotating shaft of the movable platform 41 rotates to turn down the movable platform 41, and the inner core of the battery falling on the movable platform 41 can automatically fall into the inner core collecting frame 52 for centralized collection.

To sum up, according to the disassembling mechanism for the waste battery module provided by the present disclosure, by adopting the clamping mechanism 2, the cutting mechanism 3, the placement platform 4, the storage box 5, the traction mechanism 6 and the linkage mechanism 7, the clamping part of the clamping mechanism 2 can clamp and fix the battery to be disassembled at the placement platform 4, and the shell of the battery can be cut and disassembled by the cutting part of the cutting mechanism 3. When the cutting part of the cutting mechanism 3 moves and cuts, the sliding block 73 of the linkage mechanism 7 can be pulled by the traction mechanism 6 to move to one end of the placement platform 4, and then the clamping part of the clamping mechanism 2 can be pushed to move from the movable platform 41 to the fixed platform 42 by the connecting arm 731 at the top portion of the sliding block 73, so that the waste battery fixed in the clamping part of the clamping mechanism 2 can be pulled and broken from both sides along the notch opening slot on the shell, and the inner core of the battery can freely fall on the movable platform 41, thus being separated from the shell of the battery. In the process of moving, the sliding block 73 pushes the linkage rack 74 to drive the gear in the gear box 75 to rotate, so that the movable platform 41 can rotate around the rotating shaft thereof under the action of the gear in the gear box 75, so that the inner core of the battery falling on the movable platform 41 can fall into the inner core collecting frame 52 along with the turned movable platform 41, and the shell of the battery fixed at the clamping part of the clamping mechanism 2 can move to the shell collecting frame 51 and fall. After the waste battery is disassembled by the device, the shell of the battery and the inner core of the battery can be collected by classification, which reduces the complicated operation caused by manually peeling off the shell of the battery, improves the disassembling rate of the battery module, and avoids the bodily injury caused by manually peeling off the shell of the battery.

In the descriptions of the specification, the descriptions with reference to the terms "one embodiment", "some embodiments", "example", "specific example" or "some examples", etc., refer to that specific features, structures, materials, or characteristics described with reference to the embodiments or examples are included in at least one embodiment or example of the present disclosure. In the specification, the schematic representation of the above terms should not be understood as necessarily referring to the same embodiment or example. Moreover, the specific features, structures, materials or characteristics described may be combined in any one or more embodiments or examples in a suitable manner. In addition, those skilled in the art may join and combine different embodiments or examples described in the specification.

Although the embodiments of the present disclosure have been shown and described above, it may be understood that the above embodiments are exemplary and cannot be understood as limiting the present disclosure, and those of ordinary skills in the art may make changes, modifications, substitutions and variations to the above embodiments within the scope of the present disclosure.

The invention claimed is:

1. A disassembling mechanism for a waste battery module, comprising a substrate, wherein: a clamping mechanism, a cutting mechanism, a placement platform, a storage box, a traction mechanism and a linkage mechanism are provided at a top portion of the substrate; the clamping mechanism and the cutting mechanism are respectively located at two ends of the top portion of the substrate; the placement platform is arranged right below a clamping part of the clamping mechanism, and the placement platform comprises a movable platform and a fixed platform, and the movable platform is rotatably arranged in a center of the fixed platform; a cutting part of the cutting mechanism extends to right above the movable platform of the placement platform; the storage box comprises a shell collecting frame and an inner core collecting frame, the shell collecting frame is arranged below the clamping mechanism at one end of the fixed platform far away from the movable platform, and the inner core collecting frame is arranged right below the movable platform; the linkage mechanism comprises a sliding rod, a sliding block, a linkage rack and a gear box; the sliding rod is arranged between the inner core collecting frame and a fixed end of the cutting mechanism along a length direction of the substrate; the sliding block and the linkage rack are both slidably arranged on the sliding rod, the linkage rack is located between the inner core collecting frame and the sliding block, and a spring is sleeved outside the sliding rod between the sliding block and the fixed end of the cutting mechanism; two connecting arms for connecting the clamping part of the clamping mechanism are movably provided at a top portion of the sliding block; the gear box is fixed at a rotating shaft of the movable platform through a fixing rod, and the gear box is provided with an upper sliding rod and a lower sliding rod, the upper and lower sliding rods are connected through a gear in the gear box, and one end of the upper or lower sliding rod is connected with the linkage rack, so that, when sliding and moving along the sliding rod, the linkage rack is capable of pushing the upper or lower sliding rod to drive the gear in the gear box to rotate, and linking the movable platform to rotate around the rotating shaft thereof; and the traction mechanism is fixed at one end of the clamping mechanism far away from the placement platform, and one end of a traction member of the traction mechanism is connected with the cutting mechanism, and the other end of the traction member is connected with the sliding block.

2. The disassembling mechanism for the waste battery module according to claim 1, wherein: the clamping mechanism comprises a pedestal, a first motor, a screw stem, two slides, two supporting racks and two clamping rods; the pedestal is arranged along a width direction of the substrate; the first motor is fixed at one end of the pedestal; the screw stem is arranged inside the pedestal along an arrangement direction of the pedestal, and one end of the screw stem is connected with an output shaft of the first motor; the two slides are both sleeved outside the screw stem and slidably connected with the pedestal, so that the screw stem is capable of driving the two slides during rotating, to move to a center of the pedestal or to two ends of the pedestal synchronously; the two supporting racks are respectively fixed on top portions of the two slides, the two supporting racks both have a sector structure, and the two supporting racks are symmetrically arranged about a central axis in the length direction of the substrate; and the two clamping rods are fixed above the two supporting racks respectively, and each of the clamping rods is capable of moving along an arc-shaped edge of each of the supporting racks below the clamping rod; one end of the clamping rod is movably connected with the connecting arm, and a movable clamping plate is provided on one side of the clamping rod close to the cutting mechanism, so as to allow the clamping rod to form the clamping part of the clamping mechanism for fixing and clamping the waste battery.

3. The disassembling mechanism for the waste battery module according to claim 2, wherein: a guide groove is provided on the arc-shaped edge of each of the supporting racks, and a guide block matched with the guide groove is provided at a bottom portion of each of the clamping rods, so as to allow at least one of the clamping rods to slide and move along the arc-shaped edge of each of the supporting racks through the match between the guide block and the guide groove.

4. The disassembling mechanism for the waste battery module according to claim 3, wherein: the shell collecting frame is located right below a sector groove of each of the supporting racks; and when the clamping rod slides and moves along the arc-shaped edge of each of the supporting racks, a clamping gap of the movable clamping plate is always located in an opening range of the shell collecting frame.

5. The disassembling mechanism for the waste battery module according to claim 2, wherein: the shell collecting frame is located right below a sector groove of the supporting racks; and when the clamping rod slides and moves along the arc-shaped edge of each of the supporting racks, a clamping gap of the movable clamping plate is always located in an opening range of the shell collecting frame.

6. The disassembling mechanism for the waste battery module according to claim 2, wherein: the cutting mechanism comprises a second motor, a protective cover, a fixed plate, a blade and a telescopic rod; the telescopic rod is connected with the substrate, the fixed plate is fixed at a top end of the telescopic rod, and a slide track is provided at a bottom portion of one end of the fixed plate far away from the telescopic rod, and the protective cover is slidably arranged in the slide track; the second motor is fixed at an outer side of one end of the protective cover; and the blade is rotatably arranged inside the protective cover and connected with an output shaft of the second motor, so as to allow the blade to form the cutting part of the cutting mechanism.

7. The disassembling mechanism for the waste battery module according to claim 6, wherein: an opening is provided at a bottom end of the protective cover, and another sliding block matched with the slide track is provided at a top end of the protective cover.

8. The disassembling mechanism for the waste battery module according to claim 7, wherein: the traction mechanism comprises a mounting plate, two first guide wheels, two second guide wheels, a pulling rope and a tension wheel; the mounting plate is connected to a middle portion of the substrate on one side of the pedestal far away from the supporting rack; the two first guide wheels are respectively fixed at an upper end and a lower end of one side of the mounting plate facing the pedestal; the two second guide wheels are respectively fixed right below a middle portion of each of the two supporting racks; the tension wheel is fixed at one end of the protective cover; and one end of the pulling rope is connected with the tension wheel, and the other end of the pulling rope passes through the two first guide wheels successively, and is divided into two ropes, which respectively extend to the two second guide wheels, and then extend to both sides of the sliding block from the two second guide wheels and are connected with the sliding block, so as to allow the pulling rope to form the traction member connected with the cutting mechanism and the sliding block.

9. The disassembling mechanism for the waste battery module according to claim 8, wherein: connecting rods for connecting the two ropes of the pulling rope are provided on the both sides of the sliding block.

10. The disassembling mechanism for the waste battery module according to claim 6, wherein: the traction mechanism comprises a mounting plate, two first guide wheels, two second guide wheels, a pulling rope and a tension wheel; the mounting plate is connected to a middle portion of the substrate on one side of the pedestal far away from the supporting rack; the two first guide wheels are respectively fixed at an upper end and a lower end of one side of the mounting plate facing the pedestal; the two second guide wheels are respectively fixed right below a middle portion of each of the two supporting racks; the tension wheel is fixed at one end of the protective cover; and one end of the pulling rope is connected with the tension wheel, and the other end of the pulling rope passes through the two first guide wheels successively, and is divided into two ropes, which respectively extend to the two second guide wheels, and then extend to both sides of the sliding block from the two second guide wheels and are connected with the sliding block, so as to allow the pulling rope to form the traction member connected with the cutting mechanism and the sliding block.

11. The disassembling mechanism for the waste battery module according to claim 10, wherein: connecting rods for connecting the two ropes of the pulling rope are provided on the both sides of the sliding block.

12. The disassembling mechanism for the waste battery module according to claim 1, wherein: at least one limiting groove for limiting a sliding stroke of the linkage rack is provided on an outer side wall of the sliding rod.

13. The disassembling mechanism for the waste battery module according to claim 1, wherein: the gear box is internally provided with a first gear, a first sliding rod, a second gear, a second sliding rod, a third gear and a fourth gear; the first gear and the third gear are arranged on the same rotating shaft; the second gear is rotatably arranged right below the first gear; the fourth gear is arranged on the rotating shaft of the movable platform and meshed with the third gear; and the first sliding rod and the second sliding rod respectively form the upper sliding rod and the lower sliding rod of the gear box, the first sliding rod is provided with a tooth socket meshed with the first gear at an upper end, and the first sliding rod is provided with a tooth socket meshed with the second gear at a lower end; the second sliding rod is provided with a tooth socket meshed with the second gear at an upper end, and one end of the second sliding rod is connected with the linkage rack.

* * * * *